United States Patent Office 2,801,186
Patented July 30, 1957

2,801,186

COMPOSITION AND PROCESS

Guy B. Alexander and Ralph K. Iler, Wilmington, Del., assignors to E. I. du Pont de Nemours and Company, Wilmington, Del., a corporation of Delaware No Drawing. Application September 14, 1954, Serial No. 456,073

8 Claims. (Cl. 106—288)

This invention relates to novel organophilic siliceous solid compositions and methods for making them, and is more particularly directed to such compositions comprising a solid substrate having a surface of silica and a surface area greater than 1 square meter per gram, there being chemically bonded through oxygen to different silicon atoms in said silica surface organosilyl groups and hydrocarbon groups of 1 to 18 carbon atoms wherein the carbon attached to the oxygen is also attached to hydrogen, the ratio of organosilyl groups to hydrocarbon groups being from 1:10 to 20:1, and the invention being further directed to processes for producing said novel compositions, the processes comprising mixing a substrate of the character described with an organosilane containing a silanol-reactive group, whereby the silanol-reactive group reacts with a surface-silanol group on the substrate to form a chemical bond, through oxygen, between the organosilyl group of the organosilane and a silicon atom of the silica, and heating the organosilyl-silica product at a temperature of at least 100° C. with an alcohol of the formula R—OH, where R is a hydrocarbon radical of 1 to 18 carbon atoms in which the carbon attached to oxygen is also attached to hydrogen, while maintaining the water content of the system below about 5% by weight of the alcohol.

Compositions known as estersils, having a structure consisting of a solid substrate with a silica surface to which hydrocarbon groups of 2 to 18 carbon atoms are chemically bonded through oxygen-silicon bonds are described in Iler U. S. Patent 2,657,149. Estersils have at least enough ester groups (i. e., —OR groups) on the surface of the substrate to make them organophilic, the estersils being preferentially wetted by butanol in a butanol-water mixture. The ester groups impart to the substrate other unique and valuable properties such as improving its dispersibility in organic systems, with the consequence that the estersils are useful for such purposes as thickening oils to make greases and as reinforcing fillers for organic elastomers, especially elastomeric polyhaloprenes, silicones, and the like.

While greases containing estersils as thickeners, and elastomers containing estersils as fillers, have many outstanding properties, they still may possess properties which could be improved to advantage. Thus, an improvement in the hydrolytic stability of estersils in greases would considerably extend the field of usefulness of the greases. Similarly, an improvement in the high-temperature stability of silicone elastomers containing estersils as fillers would extend the usefulness of the elastomers.

Now according to the present invention it has been found that by mixing a solid substrate, having a surface of silica and a surface area of 1 to 1000 square meters per gram, with an organosilane containing a silanol-reactive group to effect reaction and form a chemical bond through oxygen between the organosilyl group of the organosilane and a silicon atom of the silica, and heating the organosilylsilica product at a temperature of at least 100° C. with an alcohol of the formula R—OH, where R is a hydrocarbon radical of 1 to 18 carbon atoms in which the carbon attached to oxygen is also attached to hydrogen, while maintaining the water content of the system below about 5% by weight of the alcohol, there are formed novel organophilic, siliceous solid compositions in which there are chemically bonded, through oxygen, to different silicon atoms in the surface of a substrate as described, organosilyl groups and R groups, the ratio of organosilyl groups to hydrocarbon groups being from 1:10 to 20:1. The novel compositions have remarkably improved hydrolytic stability as grease thickeners and when incorporated into silicone elastomers as fillers give products of improved stability at elevated temperatures.

The substrate treated according to this invention may be any solid having at least a surface of silica and having a surface area of 1 to 1000 square meters per gram. In the sense that the substrate contains silica at least upon its surface it is said to be siliceous, but it will be understood that the particle need not be of a homogeneous siliceous character. In other words, the substrate can consist of a particle of a non-siliceous material, such as titanium dioxide having a surface coating of silica. Similarly, the substrate can consist of a silicate such as iron or magnesium silicate, in which the silica is associated with the metal oxide on the surface as well as in the core.

The substrate may be of natural or synthetic origin. It will be readily apparent that various metal silicates of the type just mentioned are available in nature in the form of various clays, talc, asbestos, and volcanic ash, vermiculite, and the like. All of these materials are available in a form from which they may be readily reduced down in size to the range where they have a specific surface area of at least 1 m.$^2$/g. Silica sand, on the other hand, while qualifying with regard to composition, would not be suitable because it is difficult to grind to a small enough size to have the required specific surface area. It will be noted that solid particles will necessarily be no larger than about 2 to 3 microns in diameter in order to have the desired specific surface area.

Synthetically prepared materials, both silicates and silica per se, can be prepared by various precipitation methods in a suitable form to be treated according to this invention. A number of precipitated silicas are described in United States Patent 2,657,149 to R. K. Iler and such precipitated silicas are among the preferred substrates according to this invention.

The substrate must be in solid form. From the description of substrates given in the above-mentioned Iler Patent 2,657,149 it will be understood that the substrate can consist of particles which are aggregates of still smaller ultimate particles. The preferred substrates are of supercolloidal size, but the substrates can also be of colloidal dimensions, provided the particles have a solid physical structure.

The substrate must have a specific surface area of at least one square meter per gram (m.$^2$/g.), and ordinarily will have a specific surface no greater than 1000 m.$^2$/g. This means that the substrate particles must be either very small or porous. For solids subdivided into essentially spherical, non-porous particles, a specific surface of 1 m.$^2$/g. corresponds to an average particle diameter of 2 to 3 microns, while for higher specific surface areas the average diameter of discrete particles would become progressively smaller. A preferred class of substrates have surface areas from 100 to 600 m.$^2$/g. and are in the form of porous aggregates, which can consist of very small ultimate spherical particles joined together into chains and 3-dimensional networks. In a preferred class of substrates such pores are at least 4 millimicrons in average diameter, as more fully described in the already-mentioned Iler Patent 2,657,149.

In the case of certain substrates, especially the naturally occurring silicates such as clays and asbestos, the proportion of silicon atoms on the surface of the particles may be undesirably low. This proportion can be increased by treating the particles with a strong acid, such as sulfuric, to leach out some of the metal ions from the surface, leaving substantially a surface of only silica. Similarly, a coating of amorphous silica may be deposited on the surface of various particles by releasing active silica in the presence of such particles, the product thereby produced being suitable as a substrate. Such techniques are described in the aforementioned Patent 2,657,149.

Now having selected a suitable substrate one mixes it with an organosilane containing a silanol-reactive group to effect chemical reaction between the silanol-reactive group and a surface-silanol group on the substrate and thereby form a chemical bond, through oxygen, between the surface silicon atom and the silyl group of the organosilane. For instance, one mixes dimethyldichlorosilane with an amorphous silica substrate which, of course, has silano

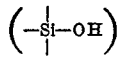

groups on its surface. One or both of the choloro groups reacts with the hydroxyl of the silanols, spitting out HCl and effecting chemical bonding of the dimethyl silyl group to the surface silicon through oxygen.

It will be understood that the term "organosilane" includes compounds bearing an organosilyl,

group in which R stands for a hydrocarbon group. The hydrocarbon group can be a group such as methyl, ethyl, vinyl, or phenyl. The organosilane also contains at least one silanol-reactive group. By "silanol-reactive" is meant a group which is reactive with the hydroxyl of a surface-silanol group. The term includes halo groups, such as chloro and bromo, alkoxy groups, hydroxyl groups, OM groups, where M is alkali metal, and amino groups—in short, a hydroxyl group or any group which can be hydrolyzed to a hydroxyl. Letting X represent the silanol-reactive group, the organosilane compound will necessarily have the structure

with the other two valences of the silicon being satisfied by the same or different R and X groups, or by being joined to additional organosilyl groups of similar type.

Among the preferred organosilane compounds for coating the substrate according to this invention are: monomethyltrichlorosilane, dimethyldichlorosilane, trimethylchlorosilane, the corresponding ethyl, vinyl, and phenyl chlorosilanes, and the hydroxy and metalloxy compounds of the methyl, ethyl, vinyl, and phenyl silanes, as, for instance, diphenylsilanediol.

It will be observed that if the organosilane compound used contains more than one silanol-reactive group, the second and other groups can also react with surface silanols, so that there are two or more points of attachment of the organosilane residue to the substrate. However, the spacial arrangement of such additional silanol-reactive groups may be such that multiple attachment to the substrate is not possible. The presence of excess halo or amino groups may be undesirable, and in this event, these may be removed after the initial reaction with the substrate silanols. This is accomplished by reacting them with water, alcohol, or another source of hydroxyl groups, whereby to substitute hydroxyl or alkoxy radicals for the excess silanol-reactive groups. Further reaction may, of course, occur through the splitting out of water between silanols on adjacent silicon atoms.

The organosilane may be in gaseous form, as when dimethyldichlorosilane is used, or in liquid form as in the case of diphenyldichlorosilane, or the organosilane may be diluted with another material, as when methyltrisiliconic acid or methyl sodium trisiliconate is used in aqueous solution.

One particularly effective process for treating the substrates with organosilyl groups is to start with an aqueous solution of alkali organosiliconate, such as sodium methyl siliconate, remove the alkali with a cation exchange resin to give the free siliconic acid, and then mix the silanol-containing substrate with this siliconic acid solution. The substrate becomes organophilic, so that when mixed with a water-insoluble, or partially water-miscible, alcohol, such as n-butanol, the substrate transfers itself to the alcohol phase, permitting mechanical separation from most, if not all, of the water present.

The proportion of the surface silanol groups on the substrate caused to react with organosilyl groups at this stage of the process, as above-described, is such that there remains at least enough silanol groups to give an organosilyl: —OR ratio of from 1:10 to 20:1 when the latter silanol groups are esterified to —OR groups in the next step of the process. Thus, one first determines the total number of silanol groups per unit of substrate surface area, and then reacts a sufficient proportion of these groups with organosilyl groups so that when at least part of the remaining groups are esterified, the organosilyl-ester ratio is in the range indicated. The specific hydroxylated surface area—that is, the number of surface silanol groups per unit area—is readily determined by the dye adsorption method described in the afore-mentioned Iler Patent 2,657,149.

It is noted that for processes in which organo-alkali-siliconates or organosiliconic acids in aqueous solutions are used, the reaction is substantially quantitative so that once the proportion of surface silanols to react has been decided upon, the amount of siliconic acid or siliconate can be calculated. On the other hand, when using gaseous organohalosilanes, for instance, it is often more practical to pass the gas continuously over a body of the substrate until a pre-determined degree of coating is reached.

The organosilyl coating is preferably applied at temperatures of from 60 to 125° C. For processes in which the organosilyl compound is applied from a volatile solvent, such as water, super-atmospheric pressures can be used if the desired treatment temperature is above the normal boiling point of the treating mixture.

In those organosilyl-treating systems where an aqueous medium is used it is preferred that the pH of the system be in the range of 7 to 10.7. Also, the rate at which the organosilyl treating agent is brought into contact with the substrate is often determinative of the type of product obtained. At low rates one can obtain even uniform distribution of organosilyl groups over the surface, whereas at too-rapid rates, multiple layer coverage of separate spots will ordinarily result. It is essential to avoid such multiple layer coverage. For instance, at 80° C. it is preferred to allow at least 10 minutes to apply the equivalent of 1 organosilyl group per square millimicron of surface area; for each 10° C. rise in temperature this time is cut substantially in half.

Now having partially coated the substrate with organosilyl groups as above-described, at least part of the remaining silanol groups on the substrate are caused to react with an alcohol to convert them to —OR groups, wherein R is a hydrocarbon group of 1 to 18 carbon atoms in which the carbon attached to the oxygen of the —OR group is also attached to hydrogen. In other words, these surface silanols are esterified with a primary or secondary alcohol of 1 to 18 carbon atoms.

The esterification reaction is effected by mixing the organosilyl-coated substrate with the alcohol and heating the mixture to at least 100° C. while maintaining the water content of the system below about 5% by weight of the alcohol. Various details of the esterification of surface silanols with alcohols are described in the above-mentioned Iler Patent 2,657,149 and such details as are applicable are herein incorporated by reference.

It is preferred to esterify with short-chain, alkyl alcohols, such as methanol, ethanol, propanol, isopropanol, n-butanol, isobutanol, or secondary butyl alcohol.

The combined organosilyl and ester groups should be present in sufficient amounts to make the final product organophilic. This state is usually reached when one-third as many organophilizing groups as would give a complete coating have been applied to the substrate. A complete coating requires about four-thirds of the coverage at which the "dye area" is 5% of the "nitrogen area," dye area being the remaining surface area of the substrate as determined by the dye adsorption method and nitrogen area being the original surface area of the substrate as determined by the nitrogen adsorption method, both methods being as described in the Iler Patent 2,657,149. About 7 monomethylsilyl, 3.5 dimethylsilyl, 2.3 trimethylsilyl, 3.8 monoethylsilyl or 3.2 monobutylsilyl groups per square millimicron of silica substrate ordinarily gives a complete coating. Similar relationships for the covering power of alkoxy groups are given in U. S. 2,657,149. From this one can calculate the sum of the necessary and relative amounts of organosilyl and ester groups needed to give from one-third to complete coverage, and to give an organosilyl to ester ratio of from 1:10 to 20:1.

The products of the invention can be used as a dispersion in an excess of the alcohol from which the ester coating has been applied. However, it is generally desired to remove any excess of alcohol or other solvent, as by evaporation, or by filtering off the solid material and drying, whereby the final product is obtained as a dry powder or in easily pulverizable form.

The products of this invention are siliceous solids which have a surface character which is at least organophilic and may also be hydrophobic. By "organophilic" is meant that the products are preferentially wetted by an organic liquid, such as butanol, in a butanol-water mixture. Details of a test for organophilic character are described in the above-mentioned Iler Patent 2,657,149. By "hydrophobic" is meant that the product actually resists wetting by water.

While broadly the ratio of organosilyl to ester groups may be from 1:10 to 20:1 the more preferred products have ratios of from 1:3 to 16:1. The number of ester groups on the product per square millimicron of surface can be determined by a method which is described as follows with particular reference to butoxy groups:

A sample is weighed quantitively, using about 5 grams, and introduced into 40 ml. of glacial acetic acid in order to wet the sample. The flask containing the mixture is equipped with a condenser cooled to a temperature below 0° C. (e. g., with Dry Ice-acetone) and 185 ml. of 10 M. sodium hydroxide is added slowly, with stirring. The mixture is then heated to reflux for 3 hours; at no time should the condenser temperature exceed 0° C. The reaction bath is cooled and then the contents of the reaction flask are subjected to steam distillation until 70–80 ml. of distillate is collected. The distillate is analyzed for alcohol content, in the case of n-butanol as follows: An aliquot of the distillate (50 ml.) is treated with 20 grams NaCl and 25 ml. of carbon tetrachloride and butanol extracted into the CCl4 by shaking for 30 min. The butanol content of the CCl4 is determined by infrared measurement. The number of butoxy groups per square millimicron is determined as follows:

$$D.E. = \frac{\%C \times 502}{n \times A_n}$$

where D. E. is the butoxy content in groups per square millimicron, %C is the percent carbon found in the sample as butoxy, $n$ is the number of carbon atoms in the alcohol (for butanol $n=4$), and $A_n$ is the nitrogen surface area of the sample. This method can be used for recovering alcohols other than n-butanol by using the proper value for $n$; however, analytical determinations other than infrared measurements may be necessary in certain cases. Once a carbon tetrachloride extract of the alcohol is obtained, common analytical techniques can be used to make a qualitative determination of which alcohol is present.

The nature of the organosilyl group present in a product can be determined by treating the silica product with hydrofluoric acid, separating and identifying, for example, by boiling point, the organosilyl fluoride so released (see Chem. Rev. 41: 97–149 (1947)).

Per cent carbon in the sample can be determined by oxidizing a weighed sample by heating in a stream of oxygen, collecting and weighing the liberated carbon dioxide. From a knowledge of the total carbon content and the alkoxy carbon, one can by difference determine the organosilyl carbon.

It is to be noted that in the products of this invention organosilyl groups and alkoxy groups attach to different silicon atoms on the surface of the substrate.

The pH of the product can be determined by slurrying 4 grams of the solid in a solution containing 10 milliliters of methanol and 10 ml. of water and reading the pH of the resulting mixture with a Beckman Model G pH meter. The preferred products have a pH in the range of 4.0 to 10.0, with 5.0 to 7.5 especially preferred in most cases.

By reason of their organophilic surface, the products of this invention are especially easy to disperse in organic systems and, for instance, are particularly effective in imparting bodying and flatting effects to oil-based paints. Moreover, as already noted above, the products have outstanding advantages as thickeners in greases and fillers in elastomers.

It will be understood that the surface silanol groups on the substrate may be either completely or partially covered by reaction with organosilyl and —OR groups. While for greatest hydrophobicity complete coverage is best, there are instances where less than complete coverage is advantageous. Thus, when the compositions of this invention are used as thickeners for oils to make greases, it is found that the compositions of the present invention which give the optimum combination of thickening efficiency and hydrolytic stability are those in which the amount of organophilizing groups applied to the substrate is from one-third to five-sixths the number that would give a complete coating on the substrate. The grease compositions of this character are more fully described and are claimed in our copending application Serial No. 456,074, filed concurrently herewith.

Elastomers reinforced by the dispersion therein of compositions of this invention are more fully described and are claimed in copending application Serial No. 456,068 filed concurrently herewith, by William S. Tatlock.

The present invention will be better understood from the following illustrative examples:

Example 1

To make a substrate for treatment according to the invention a reinforced silica gel was prepared as follows: A colloidal silica sol, containing about 17% by weight of SiO2 and having an SiO2:Na2O mole ratio of about 100, and in which the particles were of such a size that they had a surface area of about 420 m.²/g., was passed through an ion-exchange column to remove all of the ions. This column consisted of a mixed bed of anion and cation exchange resins in regenerated form. The deionized sol was diluted to 15% by weight of SiO2, and the pH was adjusted to 5 with aqueous ammonia. The silica sol was then added to an agitated body of n-butanol containing sufficient water to saturate the n-butanol at about 80° C. The ratio of the n-butanol to silica was 5.0 by weight.

The mixture was heated with continued agitation to 85° C., and kept there until gelation of the silica in the dispersed phase occurred. The temperature and agitation were maintained for about 20 min. after gelation occurred.

The silica:ammonia weight ratio was then adjusted to 100, by the addition of ammonia, thereby raising the pH in the aqueous phase to between 9 and 10. The mixture was maintained at 85° C. for a period of about 6 hours, with mild agitation. Thus a reinforced gel was produced.

To apply a coating of organosilyl groups, the reinforced gel was treated with methyl siliconic acid. This siliconic acid was prepared by passing a solution containing 2% silicone solids ($CH_3SiO_{1.5}$) in the form of sodium monomethyl siliconate through a cation exchange column ("Nalcite" HCR in the hydrogen form) at a rate of 50 ml./min., the column having a diameter of about 1.5". The effluent containing methyl siliconic acid had a pH of about 2.1. This methyl siliconic acid was then added to a slurry of the reinforced gel, above described, after heating the emulsion of gel to about 85° C., 500 ml. of methyl siliconic acid solution being added over a period of 1 hour, at a uniform rate, for each 100 g. of $SiO_2$ in the system. During this addition, the temperature was maintained in the range of 83–87° C.

It was observed that the resulting product separated into two layers. The upper, butanol-rich layer contained all of the silica; the water layer below was essentially clear. The sample was filtered, and the water layer, which had a pH of 9.7, was discarded. n-Butanol was added to the filter cake and the mixture was dehydrated by azeotropic distillation. The uncoated or uncovered silanol groups on the silica substrate were then esterified by heating the anhydrous n-butanol slurry to a temperature of 285° C. for 15 minutes. The cooled slurry was finally dried in a vacuum oven at 100° C.

The product was hydrophobic; it had a nitrogen surface area of about 300 m.$^2$/g., and contained 7.5% carbon. Calculated from the quantity of methyl siliconic acid added, it had 2.5 methyl silyl groups per square millimicron on its surface, which accounts for 1.8% of the total carbon. By difference, there is 5.7% carbon at butoxy groups, which corresponds to 2.4 butoxy groups per square millimicron.

The product had a pH of 7.0, a coalescence factor of about 50%, a pore volume of about 25 millimicrons, and an oil absorption of about 450 ml./100 g. product.

*Example 2*

A product of the invention having a higher ratio of organosilyl groups to hydrocarbon groups than in Example 1 was prepared as follows:

A reinforced gel was prepared according to the process described in Example 1. A butanol slurry of the reinforced gel was treated with methyl siliconic acid as follows: A portion of slurry containing 150 g. of silica was treated with 1.5 liters of 2% (based on $CH_3SiO_{1.5}$) methyl siliconic acid, corresponding to 20% silicone solids based on $SiO_2$, or 3.6% carbon based on silica. The methyl siliconic acid was added over a period of about 1 hour, while maintaining a temperature of about 80° C.

A small sample of the methylsilyl-treated silica product was dried in a vacuum oven in order to avoid esterification, and it was found to contain 3.6% carbon, corresponding to the amount of carbon added to the sample in the form of methyl siliconic acid. This product had a surface area of 324 m.$^2$/g. This calculates to be about 5.6 methyl silyl groups per square millimicron. (When this sample was milled with silicone gum, a very poor stock was obtained.)

The treated silica was found to have a decided organophilic character, as shown by the fact that the butanol-water emulsion containing it separated into two phases, a butanol-rich phase containing all the silica, and an aqueous phase which was essentially clear. The aqueous phase was removed by filtration and the silica in the butanol layer was transferred to anhydrous n-butanol by azeotropic distillation. The silica was esterified by heating the anhydrous n-butanol slurry to 285° C. The product was obtained from this slurry by drying the cooled reaction mixture in a vacuum oven at 110° C.

The final product was hydrophobic; it had a nitrogen surface area of 307 m.$^2$/g., a percent carbon of 7.1, and a pH of 6.7. Based on these data, the product had 5.6 methyl silyl groups per square millimicron, and 1.43 butoxy groups per square millimicron. The ratio methylsilyl groups to butoxy groups was 3.9. (This product milled satisfactorily into silicone gum, showing the advantage of the combined coating over the methyl silyl coating only.)

*Example 3*

This example illustrates the preparation of a product of the invention in which the organosilyl group is trialkyl-substituted.

A reinforced gel, as a emulsion in butanol, was prepared according to Example 1.

The reinforced gel emulsion was treated with ethanol in order to homogenize the liquid phase. Trimethylethoxysilane was added as a 2% solution in ethanol, until about 1.5 silyl groups/$(m\mu)^2$ had been added. This required about 10% $(CH_3)_3C_2H_5OSi$, based on the weight of the silica. The addition was made at a uniform rate over a 2 hour period while maintaining a temperature of 80° C.

The resulting slurry was dehydrated by distillation until an anhydrous n-butanol slurry was obtained. This was heated to 285° C. for 15 minutes, which caused esterification of the uncovered silanol sites. The product contained a mixed trimethylsilyl and butoxy ester coating and was hydrophobic.

*Example 4*

A reinforced gel was prepared according to the procedure given in Example 1. To 200 g. of the aqueous reinforced gel (containing about 12% $SiO_2$ solids and having a surface area of 360 m.$^2$/g.) was added 1300 g. of n-butanol and the mixture was stirred. About 1000 g. of liquid was removed and the remaining slurry was heated to 90° C. To this, 15 g. of diphenyl silanediol in 300 mls. of n-butanol was added over a period of one hour, while maintaining a temperature of 90° C. The treated gel was filtered. A sample of the filter cake was washed with acetone, dried, and analyzed for carbon. This analysis showed 4.6% carbon, corresponding to 0.53 diphenylsilyl group per square millimicron.

The majority of the wet cake was washed exhaustively with n-butanol to remove the unreacted diphenylsilanediol and the washed cake was further dehydrated by azeotropic distillation with n-butanol, and the n-butanol slurry heated to 285° C. in order to esterify the uncoated surface. The resulting product was dried in a vacuum oven at 100° C. in order to remove the excess n-butanol.

The dry product was a hydrophobic powder having a nitrogen surface area of about 305 m.$^2$/g. and a carbon analysis of 10.75%. This corresponds to 4.6% carbon as diphenylsilyl groups and 6.15% carbon as butoxy. The degree of esterification is 2.14 butoxy groups per square millimicron. Note that the degree of esterification and degree of coverage of organosilyl groups is calculated based on a surface area of 360 m.$^2$/g. for the uncoated substrate.

*Example 5*

This example shows that using a strong base, potassium hydroxide, a more efficient reaction between the silica substrate and diphenylsilanediol can be achieved than in the case using ammonia, a weak base.

A silicic acid sol was prepared by passing a sodium silicate solution ($SiO_2$=2%; $SiA_2$:$Na_2O$=3.25) through a column of Nalcite HCR ion exchange resin in the hydrogen form. Sodium silicate solution (28.4% $SiO_2$; $SiO_2$:$Na_2O$=3.25) was added to this sol to give an $SiO_2Na_2O$ ratio of 100. The sol was concentrated by evaporation at 95° C. over a period of 5 hours to 15% $SiO_2$. During this process the particles in the sol grew until the final particles size corresponded to a surface area of 400 m.²/g. The sol was completely deionized with mixed anion-cation resin, until conductivity showed that it contained less than 0.005% salt. The sol was adjusted to pH of 4.8 by adding 1 N potassium hydroxide solution.

To a flask containing 1500 g. of n-butanol and 465 g. of water, at a temperature of 60° C. was added 2000 g. of the above sol. The mixture, which was an emulsion, was heated to 85° C., whereupon the sol gelled. An additional 12.5 mls. of 1 normal KOH was added and the sol was heated for 6 hours in order to reinforce the gel.

A portion of the gel corresponding to 50 g. of silica was filtered and 2500 g. of n-butanol was added. Two hundred grams of liquid were removed from this slurry by decantation, and then 25 g. of diphenylsilanediol in 400 mls. of n-butanol was added over a period of an hour, while heating the slurry at 90° C. To the slurry was then added 3.7 mls. of 1 N sulfuric acid. The mixture was cooled and the slurry filtered to recover the treated silica. A small sample of the silica was taken at this point, washed exhaustively with acetone, and dried. Carbon analysis on this sample was 8.58%; this product was organophilic and hydrophilic.

The rest of the filter cake was washed with butanol to remove the excess diphenylsilanediol and was then dehydrated with n-butanol and heated to 285° C. in a sealed autoclave. The product was cooled, filtered, and dried in a vacuum oven at 100° C.

The product was hydrophobic and had a surface area of 311 m.²/g., carbon analysis of 12.4% and a pH of 4.94. It had a mixed coating of diphenylsilyl and butoxy groups.

*Example 6*

A reinforced gel was prepared according to Example 4.

A sample, consisting of a reinforced gel emulsified in water-saturated n-butanol, was treated with dimethyldiethoxysilane, 26% dimethyldiethoxy silane being added, based on the weight of the silica in the gel.

A sample of the treated silica was washed and analyzed for carbon; this analysis showed that it had 1.1 dimethylsilyl groups per square millimicron of silica surface.

The remaining treated gel was dehydrated by distillation with n-butanol and the anhydrous slurry filtered and washed with several portions of methyl alcohol in order to remove the butanol. The methyl alcohol-silica slurry was heated in a sealed autoclave to a temperature of 290° C., at which temperature the vapors were vented over a period of one-half hour, and the sample cooled in a blanket of nitrogen to a temperature of 80° C.

The product had a surface area of 310 m.²/g., and had a mixed coating of dimethylsilyl and methyl ester groups. The carbon content of the final product was 4.02%, the number of methoxy groups per square millimicron being calculated from this figure (by difference) to be 3.4.

We claim:

1. A hydrophobic composition comprising a substrate consisting of porous, supercolloidal aggregates of spherical amorphous silica particles, the aggregates having an average pore diameter of at least 4 millimicrons and a surface area of from 100 to 600 square meters per gram, there being chemically bonded, through oxygen, to different silicon atoms in the surface of said silica, hydrocarbon groups of 1 to 18 carbon atoms wherein the carbon attached to oxygen is also attached to hydrogen, and organosilicon groups of the formula $R_nSi$— where R is a hydrocarbon group and $n$ is an integer from 1 to 3, the ratio of organosilicon groups to hydrocarbon groups being from 1:3 to 16:1, and the organosilicon groups being present as a monolayer on the silica.

2. A composition of claim 1 in which the organosilicon groups are methylsilicon.

3. A composition of claim 1 in which the organosilicon groups are ethylsilicon.

4. A composition of claim 1 in which the organosilicon groups are vinylsilicon.

5. A composition of claim 1 in which the organosilicon groups are phenylsilicon.

6. A composition of claim 1 in which the hydrocarbon groups bonded to surface silicons through oxygen are aliphatic and contain from 2 to 6 carbon atoms.

7. In a process for applying an organophilic surface to a substrate of porous, supercolloidal aggregates of spherical amorphous silica particles having silanol groups on their surfaces, the aggregates having an average pore diameter of at least 4 millimicrons and a surface area of from 100 to 600 square meters per gram, the steps comprising suspending the aggregates in water to make a slurry, adding to the slurry an organosiliconate in which the organo group is a hydrocarbon group, the temperature of the slurry being maintained at 60 to 125° C. and the pH at 7 to 10.7 during said addition and the rate of addition being such that the time, in minutes, for adding one organosiliconate group per square millimicron of aggregate surface area is at least $$\frac{40}{2^{\frac{T-60}{10}}}$$

where T is the temperature in degrees centigrade, and the proportion of organosiliconate to aggregate surface area being insufficient to provide an organosiliconate group for every surface silanol group on the substrate, whereby siliconate radicals of the organosiliconate react with part of the surface silanol groups on the substrate to form a partial monolayer of organosilicon groups chemically bonded to silicon atoms of the substrate through oxygen, and heating the organosiliconate-silica product at a temperature of at least 100° C. with an alcohol of the formula R—OH, where R is a hydrocarbon radical of 1 to 18 carbon atoms in which the carbon attached to oxygen is also attached to hydrogen, while maintaining the water content of the system below about 5% by weight of the alcohol, whereby water is removed and reaction occurs between surface silanol groups and said alcohol to chemically bond hydrocarbon groups of the alcohol, through oxygen, to surface silicon atoms of the substrate.

8. A process of claim 7 wherein the hydrocarbon groups, bonded through oxygen to surface silicon atoms, contain from 2 to 6 carbon atoms.

References Cited in the file of this patent

UNITED STATES PATENTS

| | | |
|---|---|---|
| 2,589,705 | Kistler | Mar. 18, 1952 |
| 2,645,588 | Barry | July 14, 1953 |
| 2,657,149 | Iler | Oct. 27, 1953 |
| 2,676,182 | Daudt et al. | Apr. 20, 1954 |
| 2,680,696 | Broge | June 8, 1954 |
| 2,692,863 | Iler | Oct. 26, 1954 |
| 2,705,206 | Wagner | Mar. 29, 1955 |
| 2,705,222 | Wagner | Mar. 29, 1955 |